UNITED STATES PATENT OFFICE.

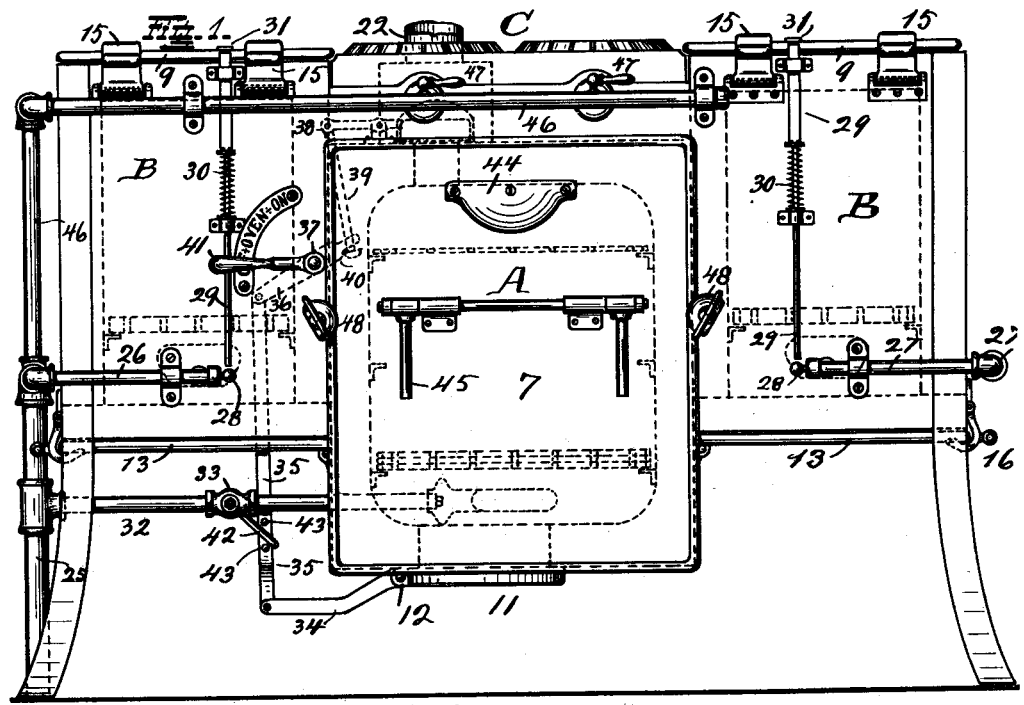
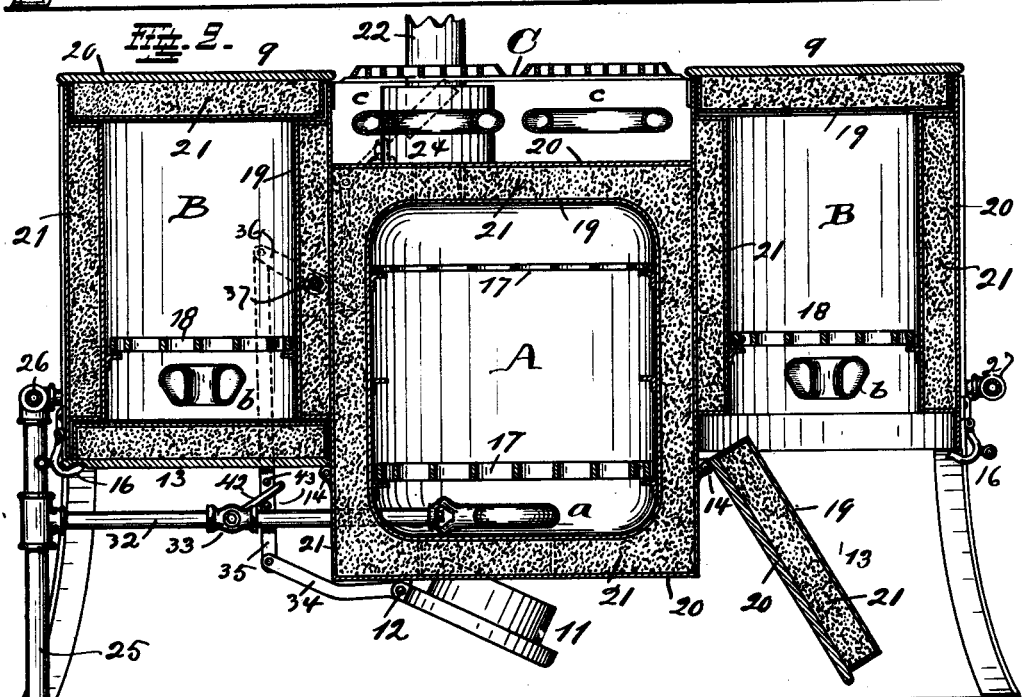

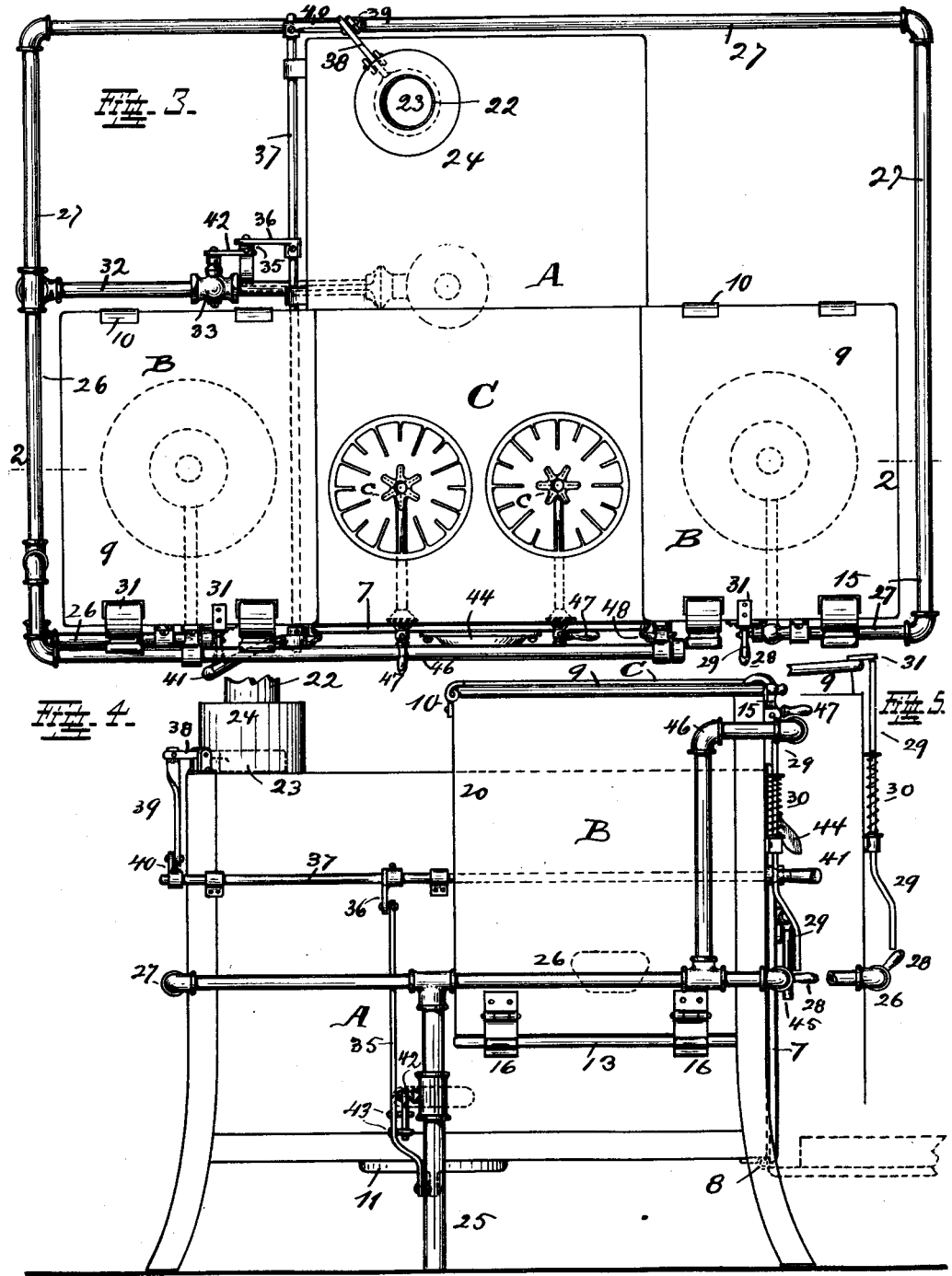

JAMES F. MIRRIELEES, OF CINCINNATI, OHIO.

COOKING APPARATUS.

1,087,886. Specification of Letters Patent. Patented Feb. 17, 1914.

Application filed January 14, 1911. Serial No. 602,548.

*To all whom it may concern:*

Be it known that I, JAMES F. MIRRIELEES, a citizen of the United States, and a resident of Cincinnati, Hamilton county, State of Ohio, have invented a certain new and useful Cooking Apparatus; and I do declare the following to be a clear, full, and exact description of the invention, attention being called to the two sheets of drawings which accompany this application and form part hereof.

The advantages of cooking food without using heat directly as produced from fire, or of completing such cooking of food-matter by a limited use only of such directly produced heat, have long been recognized and various devices have been constructed to be used for the purpose. Accordingly devices have been provided of an arrangement and construction which permits part of the cooking-operation to be performed without immediate use and application of heat produced directly from flame, provided a certain amount of heat derived from use of flame has previously been generated.

My invention concerns devices of this kind and is embodied in an apparatus so constructed as to permit generation of heat by means of fire gas being the fuel intended to be used and it is adapted to continue to operate after the use of fire has been dispensed with, in a manner to extend the action of the heat so obtained, to permit continuation and completion of the cooking operation without requiring further use of fire.

My invention consists more particularly of means and mechanical devices used in connection with the closure of compartments and the manipulation of burners and whereby they are caused to operate by coaction in a manner to effect automatically control of the gas-supply.

In the following specification and particularly pointed out in the claim at the end thereof, will be found a full description of my apparatus, together with its operation, parts and construction, which latter is also illustrated in the accompanying drawing, in which:—

Figure 1, is a front-view of the apparatus. Fig. 2, is a longitudinal section of it, the plane of section being indicated by a line 2—2 in Fig. 3. Fig. 3, is a top-view of the apparatus. Fig. 4, is an end-view of the same, showing more particularly the left side with reference to Fig. 1. Fig. 5, shows a portion of the preceding view with certain parts in a different position.

The number of compartments adapted to receive food-matter to be prepared is not material, three being shown including an oven. As to arrangement, the oven constituted by compartment A is provided in the center with a cooking-compartment B on each side of it. Each compartment has openings controlled by doors and covers to permit placing of the food-matter, 7 being the door for the oven-compartment, hinged at 8 to permit access from the front. Access to compartments B is from the top, covers 9 being provided, hinged at 10. All compartments are also open below, a door 11, hinged at 12 being provided for the oven-compartment, and doors 13 hinged at 14 being provided for compartments B, B. Hingedly connected, hook-shaped catches 15 are provided to hold covers 9 closed and similar catches 16 are provided for doors 13. Suitable, open-work shelves or grates are provided to support the vessels containing the food to be prepared. Note supports shown at 17 in the oven-compartment and those shown at 18 in compartments B. Compartments B project above compartment A on both sides of it, the resulting space being closed by a top C and provided with burners *c—c* below, this part to be used like an ordinary gas-stove. Top C is supported on the projecting part of compartments B and substantially even with the top of these compartments. The walls of compartments A, B and B, including their covers and doors consist each of an inner wall or shell 19, an outer one 20 spaced from it and suitable insulating material 21 between them.

Letter *a* indicates the burner for the oven-compartment and letter *b* indicates the burners for the lateral cooking compartments B, B. These burners are open at all times and no valves or other controlling means are provided in connection therewith. In using this apparatus, top C may be used like any stove or hot-plate. Oven-compartment A may also be used like the oven in any other stove. In that case burner *a* is lighted, door 11 being left open. The oven is vented through a flue-pipe 22 communicating with an opening in the top of the oven.

When the apparatus is to be used as contemplated, that is as a so-called fireless cooker, the food is first pre-heated, or partially cooked and after that finished in any of the compartments A or B. It may be pre-heated on top C and finished in any of these compartments, these latter being tightly closed to confine the heat. The compartments may also be heated first for which purpose the burners in them are used, the compartments being left open to vent the flame. The real advantage of my apparatus resides however in the possibility that the cooking of the food, after the same and the particular compartment containing it have been pre-heated by use of heat derived from the burners directly, may be finished by dispensing with the use of burners and by depending merely on the effect of the accumulated heat, no intermediate manipulation of the food, or change of position being required. The procedure for such use is as follows, the use of oven-compartment A and at least that of one of compartments B being presumed. The food, contained in suitable receptacles, pots, pans, is placed in position, supports in oven-compartment A and support 18 in compartment B being used. As to oven-compartment A, access is had through door 7, and as to compartments B, through their open top, covers 9 being raised, the compartments to be used being also open below and burners a and b are lighted. The food is now pre-heated and partially cooked, while incidentally the walls of the particular compartments become likewise hot. While this proceeds, the compartments are left open below and also on top to permit access of air to the burners and to prevent pressure-generating confinement of gases and vapors. After this has proceeded for a sufficient length of time, the burners are extinguished and the compartments are closed below and above, to confine the heat accumulated in the food and in the walls of the compartments. Below, compartment A is closed by door 11 and compartments B, are closed by doors 13, which are held in closed position by catches 16. Above, compartments B are closed by covers 9 which are held down by catches 15. The opening in the top of compartment A is closed by damper 23, shown in dotted lines and contained in a chamber 24 below the lower end of flue-pipe 22. The food remains in the same position and the cooking of it is now finished in this manner.

As will be observed, there is a certain relation between the position of the doors and covers and the condition of the burners, that is to say, the compartments for instance should be open below and above while the burners are lighted, to prevent confinement and accumulation of products of combustion and of gas and to vent the flame and they should be closed after the burners are extinguished to prevent loss of heat. To simplify the manipulation of doors, covers and burners required for this purpose and to counteract consequences of negligence on the part of the user, doors and burners and the means for their manipulation are so arranged that action on one of these parts causes automatically proper action with reference to the other part or renders possible the manipulation of the other part. To explain this it is necessary to first describe the arrangement whereby gas is supplied to the burners, which is as follows: Gas is led in by a pipe 25, which branches at its upper end, one branch 26 leading forward and around one of the front corners of the apparatus to burner b of one of compartments B (the one on the left side). The other branch 27 leads rearwardly around the stove and around the other corner to the front and to burner b of the other compartment B. Both these burners are controlled by cocks having manipulating handles 28 which, when these cocks are closed, stand out straight from the front as shown in Fig. 4. These cocks are so arranged that for the purpose of opening them, handles 28 must be turned upwardly as shown in Fig. 5, which however is normally prevented by vertical locking-rods 29, slidably supported on the front of the apparatus and terminating with their lower ends immediately above these handles. Springs 30 are provided on these rods imparting to them a normal tendency to move upwardly and away from these handles, which tendency is however restrained by lugs 31 projecting from covers 9 over the upper ends of these rods when said covers are closed. It will now be noticed that burners b—b cannot be turned on unless these covers are raised. Doors 13 must also necessarily be opened to permit application of a match to the burners, so that the desired position of the parts necessary for pre-heating is obtained.

When the time has arrived for finishing the operation without further use of the burners, and compartments B are to be closed, the closing of their covers will depress the locking rods and they, by their action upon handles 28, will necessarily extinguish the burners. Thus the possibility of having an open burner in one of these compartments, after they are closed, is positively prevented. Gas for burner a of the oven compartment is taken from pipe 25 by branch pipe 32, controlled by a cock 33. This compartment has the door 11 below and a damper 23 above, to control openings which are to be open while burner a is burning, and used for pre-heating. Thereafter these openings are to be closed and burner a is to be extinguished. The automatic interaction of these parts is obtained by the following construction: 34 is an arm on door 11, connected by means of a link 35 to an arm 36 on a rocker-rod 37. 38 is an arm on damper 23 connected by a link 39 to an arm 40 on rocker-rod 37. 41 is a handle to actuate this rocker-rod and whereby, when manipulated, door 11 and damper 23 may be simultaneously operated to either open or close the openings controlled by them. 42 is an arm adapted to actuate cock 33, said arm being acted upon by pins 43 on link 35 and the connection and arrangement is such that when link 35 moves when the openings in compartment A are to be opened, said link will move arm 42 and thereby open cock 33, permitting burner *a* to be lighted. When link 35 moves with the closing movement of door 11 and damper 23, cock 33 will close at the same time and extinguish burner *a*. In this way, manipulations connected with the use of compartment A, are controlled and proper action is safe-guarded the same as in the case of compartments B, and the possibility of burner *a* being open while compartment A is closed is likewise prevented by means properly acting for the purpose. 44 is a hand-hold to manipulate door 7 and 45 are swinging props to support this door when open. 46 is a pipe supplying burners *c, c,* controlled by cocks of which 47 are the handles. 48 are locks for holding the oven-door closed. The doors may be supported and operatively connected in any other suitable way equivalent for the purpose, that is to obtain the desired automatic co-action.

Having described my invention, I claim as new:

In an apparatus for pre-heating food-matter and for finishing cooking of the same without the use of heat directly derived from flame, the combination of a compartment adapted to receive such matter and provided with openings in its lower and upper sides, a hingedly connected closure for each of these openings, a normally open gas-burner inside of the compartment, a supply-pipe for it, a cock provided with a handle to control this supply-pipe, a spring-actuated locking-rod supported outside of the compartment and a projection on the upper closure adapted to act upon the locking-rod when said closure is in closing position in a manner to depress this rod and to cause it to engage the handle on the cock in a manner to prevent manipulation of the same.

In testimony whereof, I hereunto affix my signature in the presence of two witnesses.

JAMES F. MIRRIELEES.

Witnesses:
  AUGUSTUS M. SOSA,
  C. SPENGEL.